(12) United States Patent  (10) Patent No.: US 7,917,816 B1
Tsai                       (45) Date of Patent:    Mar. 29, 2011

(54) SYSTEM AND METHOD FOR DETERMINING DISPLAY FUNCTION OF BIOS ERROR INFORMATION

(75) Inventor: Ying-Chuan Tsai, Taipei Hsien (TW)

(73) Assignee: Hon Hai Precision Industry Co., Ltd., Tu-Cheng, Taipei Hsien (TW)

( * ) Notice: Subject to any disclaimer, the term of this patent is extended or adjusted under 35 U.S.C. 154(b) by 0 days.

(21) Appl. No.: 12/647,553

(22) Filed: Dec. 28, 2009

(30) Foreign Application Priority Data

Oct. 20, 2009 (CN) .......................... 2009 1 0308473

(51) Int. Cl.
*G06F 11/00* (2006.01)
(52) U.S. Cl. ....................................................... 714/57
(58) Field of Classification Search ............... 714/57
See application file for complete search history.

(56) References Cited

U.S. PATENT DOCUMENTS

| 2004/0194067 A1* | 9/2004 | Lien et al. ....................... 717/129 |
| 2007/0016827 A1* | 1/2007 | Lopez et al. ..................... 714/31 |
| 2007/0168978 A1* | 7/2007 | Lu ................................... 717/124 |

* cited by examiner

*Primary Examiner* — Scott T Baderman
*Assistant Examiner* — Jigar Patel
(74) *Attorney, Agent, or Firm* — Zhigang Ma

(57) ABSTRACT

A system is used to determine whether a display function of a basic input output system (BIOS) of a tested computer is normal. Operators can select an error information option set on an error information interface. A breakpoint address and an amending instruction can be obtained to interrupt the running of the BIOS, and parameters of a corresponding hardware of the tested computer are amended with preset values. Therefore, an error occurs in the BIOS of the tested computer. The tested computer is controlled to display the BIOS error information. Whether the display function of the BIOS of the tested computer is normal can be ascertained via comparing the displayed BIOS error information with standard BIOS error information.

5 Claims, 5 Drawing Sheets

_US 7,917,816 B1_

SYSTEM AND METHOD FOR DETERMINING DISPLAY FUNCTION OF BIOS ERROR INFORMATION

BACKGROUND

1. Technical Field

The present disclosure relates to a system and a method for determining display function of basic input output system (BIOS) error information of a tested computer.

2. Description of Related Art

Nowadays, an in-target probe (ITP) device is generally used to control a Bios of a Tested Computer to Produce Error Information, to Determine a Display Function of the BIOS error information of the tested computer. When the tested computer displays the BIOS error information, the operator needs to compare the displayed BIOS error information with standard BIOS error information in a specification. Therefore, the operator has to know the BIOS codes, which is inconvenient.

DETAILED DESCRIPTION

Figure 1:
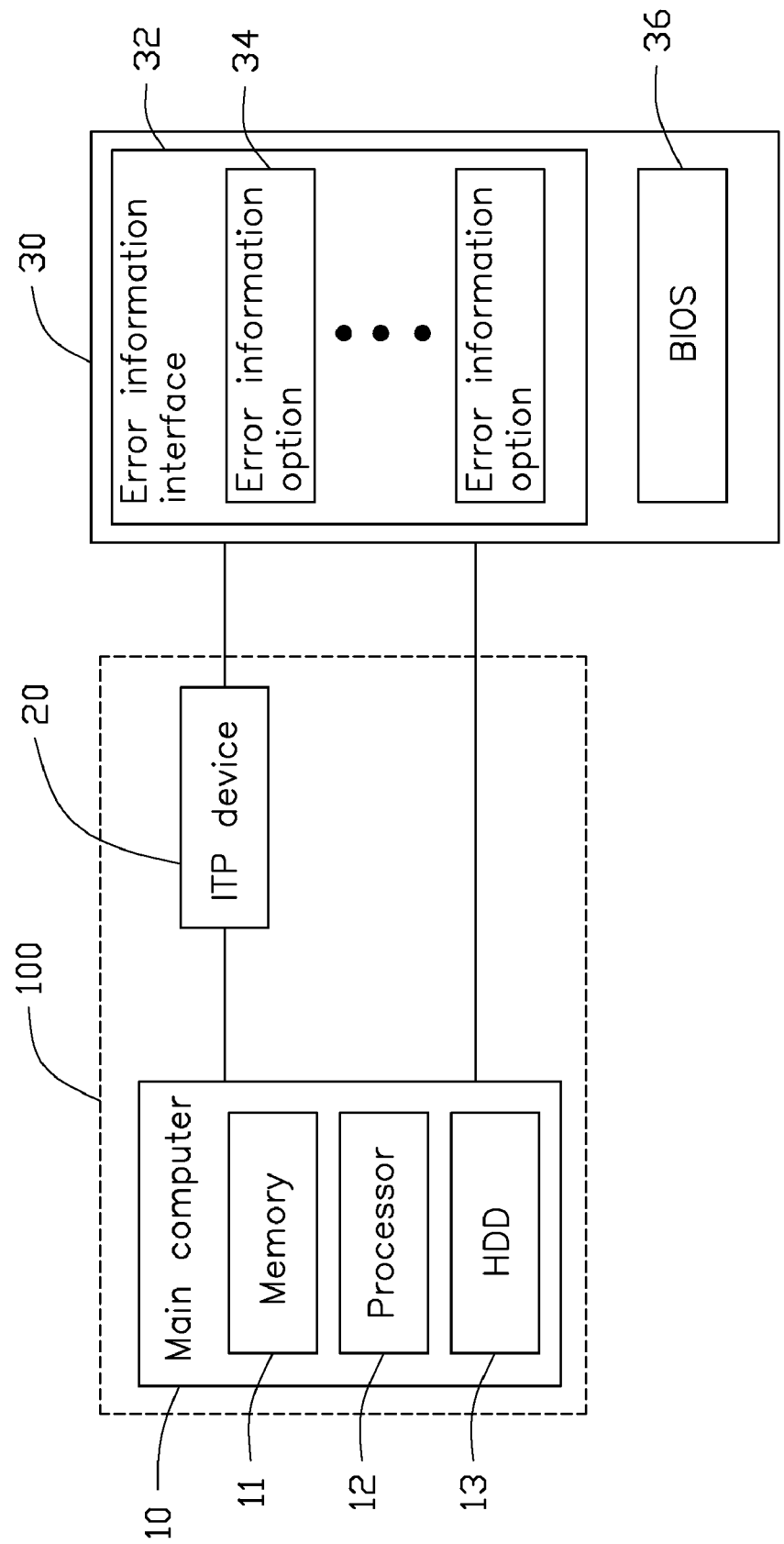
FIG. 1 is a block diagram of one embodiment of a system for determining display function of BOIS error information of a computer, the system including a hard disk drive and a memory.

Referring to FIG. 1, an exemplary embodiment of a system 100 is used to determine whether display function of basic input output system (BIOS) error information of a tested computer 30 is normal. The system 100 includes a main computer 10, an in-target probe (ITP) device 20 connected between the main computer 10 and the tested computer 30. The main computer 10 is also directly connected to the tested computer 30. The main computer 10 includes a memory 11, a processor 12, and a storage unit such as a hard disk drive (HDD) 13. The tested computer 30 includes an error information interface 32 and a BIOS 36. A plurality of error information options 34 are set to be displayed on the error information interface 32. Operators can select the plurality of error information options 34 in the error information interface 32, to make the corresponding errors occur in the BIOS 36 of the tested computer 30.

The memory 10 may be a random access memory (RAM) for temporary storage of information or a read only memory (ROM) for permanent storage of information.

Figure 2:
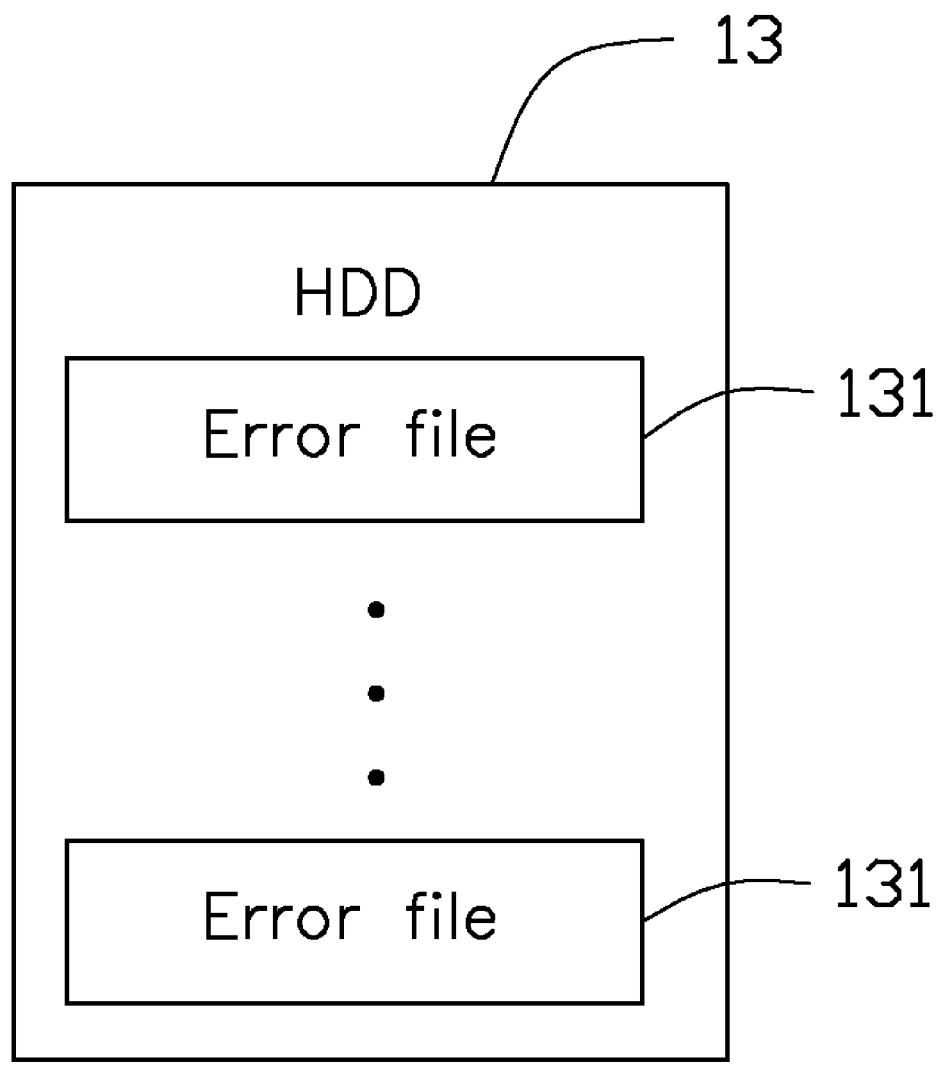
FIG. 2 is a block diagram of one embodiment of the hard disk drive of FIG. 1.

Referring to FIG. 2, the HDD 13 stores a plurality of error files 131 and some standard BIOS error information. Whether the display function of the BIOS error information of the tested computer 30 is normal can be ascertained via comparing the displayed BISO error information with the standard BIOS error information. Each error file 131 records a breakpoint address and an amending instruction. One of the plurality of error files 131 corresponds to one of the plurality of error information options 34 of the tested computer 30.

Figure 3:
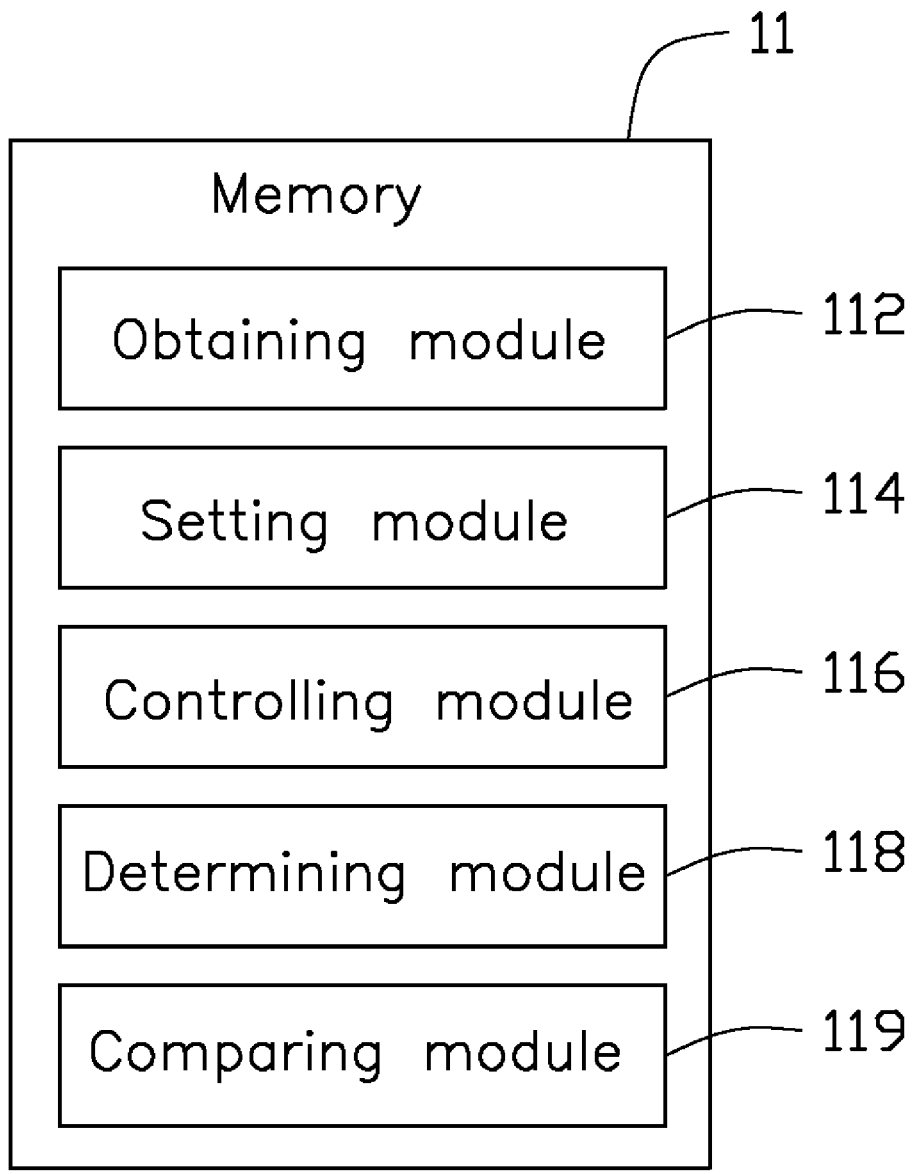
FIG. 3 is a block diagram of one embodiment of the memory of FIG. 1.

Referring to FIG. 3, the memory 11 includes an obtaining module 112, a setting module 114, a controlling module 116, a determining module 118, and a comparing module 119. The obtaining module 112, the setting module 114, the controlling module 116, the determining module 118, and the comparing module 119 may include one or more computerized instructions executable by the processor 12.

When an error information option 34 on the error information interface 32 is selected, an obtaining instruction from the tested computer 30 is transmitted. The obtaining module 112 receives the obtaining instruction and obtains a corresponding error file 131 from the HDD 13 according to the obtaining instruction, to obtain the corresponding breakpoint address and amending instruction from the corresponding error file 131, and transmit the breakpoint address to the setting module 114 and the amending instruction to the controlling module 116.

The setting module 114 controls the ITP device 20 to set a breakpoint in the BIOS of the tested computer 30 according to the received breakpoint address. When the BIOS runs to the breakpoint, the running of the BIOS is interrupted.

The determining module 118 determines whether the running of the BIOS is interrupted. If the running of the BIOS is interrupted, the determining module 118 transmits an interrupting instruction to the controlling module 116. If the running of the BIOS is not interrupted, the determining module 118 continues determining the running of the BIOS.

The controlling module 116 controls the ITP device 20 to control the tested computer 30 to run the BIOS, and controls the ITP device 20 to amend parameters of a corresponding hardware of the tested computer 30 with preset values, after receiving the interrupting instruction, according to the received amending instruction. The controlling module 116 further controls the tested computer 30 to continue running the BIOS after amending the parameters of the corresponding hardware. Therefore, an error corresponding to the selected error information occurs. The BIOS error information is displayed by the tested computer 30.

The comparing module 119 compares the displayed error information with the standard BIOS error information stored in the HDD 13, to determine whether the displayed error information is consistent with the corresponding stored standard BIOS error information. If the displayed error information is consistent with the corresponding stored standard BIOS error information, the comparing module 119 transmits a pass instruction to the controlling module 116. If the displayed error information is not consistent with the corresponding stored standard BIOS error information, the comparing module 119 transmits a failed instruction to the controlling module 116.

The controlling module 116 also controls the tested computer 30 to remind the operator that the tested computer 30 can display the BIOS error information correctly after receiving the pass instruction, or remind the operator that the tested computer 30 fails to display the BIOS error information correctly after receiving the failed instruction.

The determining module 118 further determines whether all the error information options 34 on the error information interface 32 are selected after displaying the BIOS error information correctly. If all the error information options 34 on the error information interface 32 are selected, the determining module 118 transmits an end instruction to the controlling module 116. If at least one error information option 34 on the error information interface 32 fails to be selected, the determining module 118 transmits a next instruction to the controlling module 116.

The controlling module 116 further controls the tested computer 30 to remind the operator that another error information option 34 needs to be selected after receiving the next instruction. The controlling module 116 further controls the tested computer 30 to remind the operator that the determination is over after receiving the end instruction.

Figure 4A:
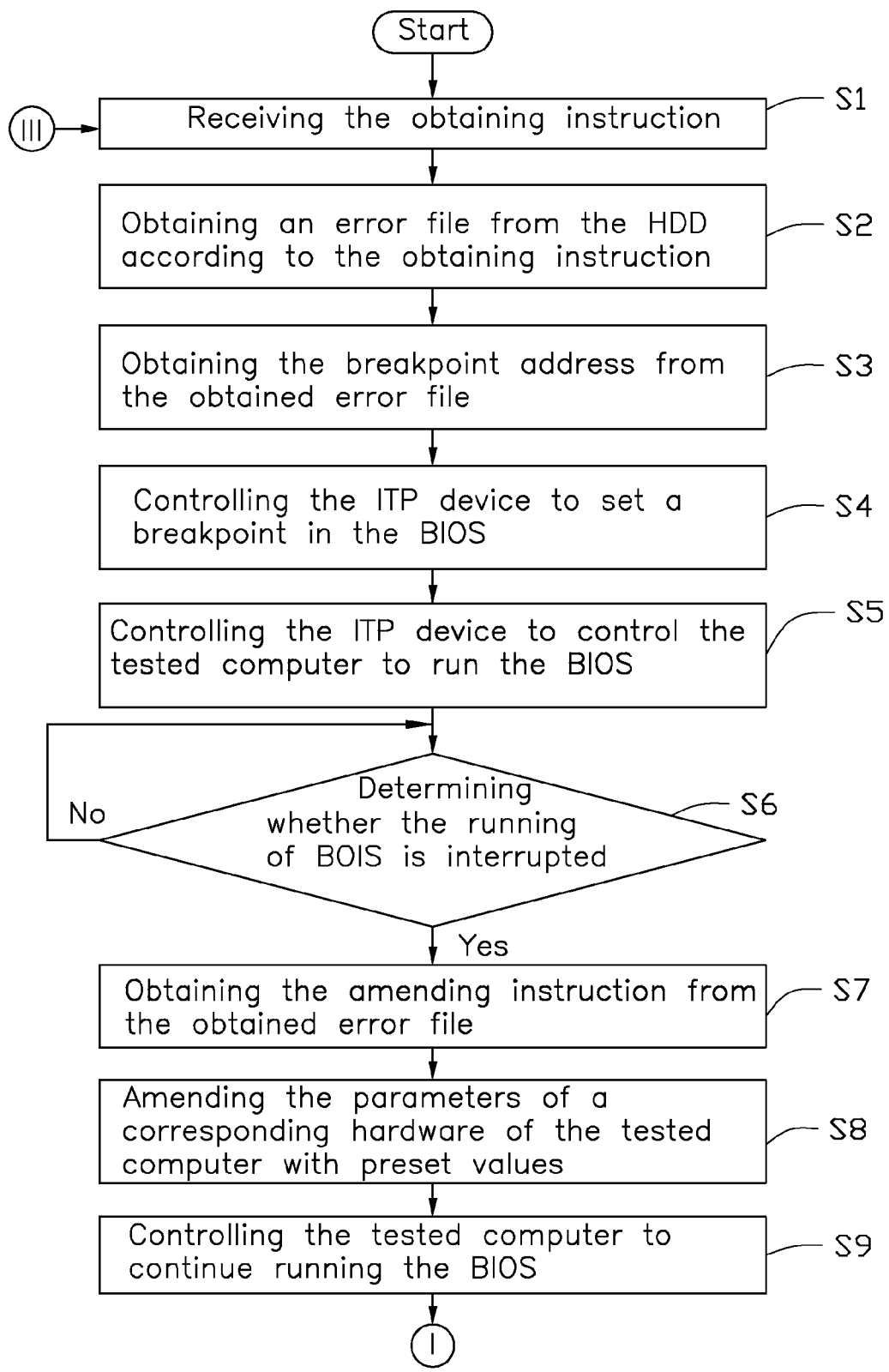
FIGS. 4A and 4B are a flowchart illustrating one embodiment of a method for determining display function of BOIS error information of a computer.
Figure 4B:
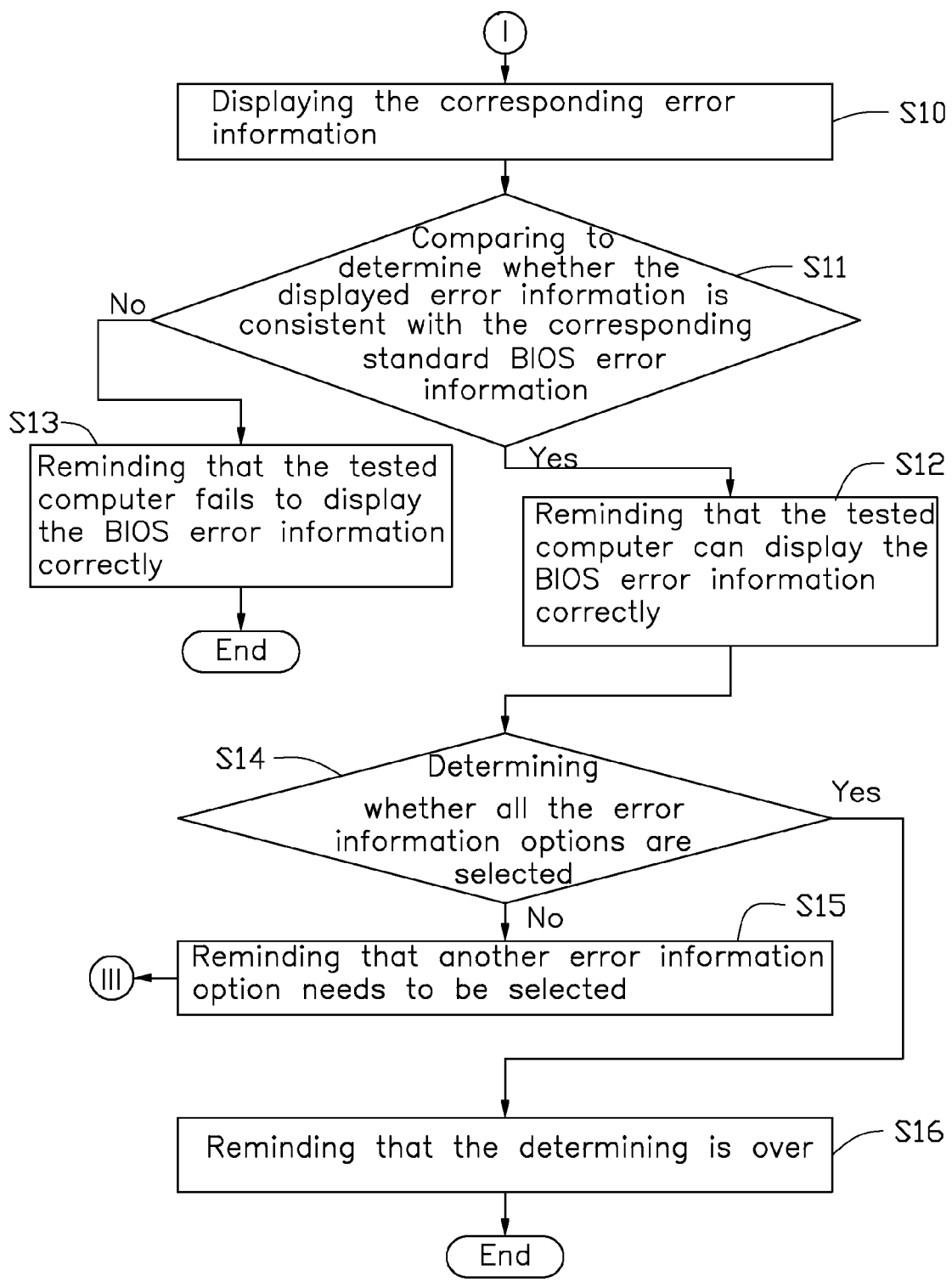

Referring to FIGS. 4A and 4B, an exemplary embodiment of a method for determining whether the display function of the BIOS error information of the tested computer 30 is normal includes the following steps.

In step S1, the obtaining module 112 receives the obtaining instruction corresponding to an error information option 34 selected by the operator on the error information interface 32.

In step S2, the obtaining module 112 obtains an error file 131 corresponding to the selected error information option 34 from the HDD 13 according to the obtaining instruction.

In step S3, the obtaining module 112 obtains the breakpoint address from the obtained error file 131 and transmits the breakpoint address to the setting module 114.

In step S4, the setting module 114 controls the ITP device 20 to set a breakpoint in the BIOS of the tested computer 30 according to the received breakpoint address.

In step S5, the controlling module 116 controls the ITP device 20 to control the tested computer 30 to run the BIOS.

In step S6, the determining module 115 determines whether the running of the BOIS of the tested computer 30 is interrupted. If the running of the BIOS of the tested computer 30 is interrupted, step S7 is implemented. If the running of the BIOS of the tested computer 30 is not interrupted, step S6 is repeated.

In step S7, the obtaining module 113 obtains the amending instruction from the obtained error file 131 and transmits the amending instruction to the control module 116.

In step S8, the controlling module 116 controls the ITP device 20 to amend the parameters of a corresponding hardware of the tested computer 30 with the preset values according to the received amending instruction.

In step S9, the controlling module 116 controls the tested computer 30 to continue running the BIOS.

In step S10, the tested computer 30 displays the corresponding error information via the error information interface 32, after running the BIOS.

In step S11, the comparing module 119 compares the displayed error information with the standard BIOS error information stored in the HDD 13, to determine whether the displayed error information is consistent with the corresponding stored standard BIOS error information. If the displayed error information is consistent with the corresponding standard BIOS error information, the comparing module 119 transmits the pass instructions to the controlling module 118, step 12 is implemented. If the displayed error information is not consistent with the corresponding standard BIOS error information, the comparing module 119 transmits the failed instruction to the controlling module 116, step 13 is implemented.

In step S12, the control module 118 controls the tested computer 30 to remind the operator that the tested computer 30 can display the BIOS error information correctly, after receiving the pass instruction. Step 14 is implemented.

In step S13, the control module 118 controls the tested computer 30 to remind the operator that the tested computer 30 fails to display the BIOS error information correctly, after receiving the failed instruction. The procedure ends.

In step S14, the determining module 118 determines whether all the error information options 34 in the error information interface 32 are selected by the operator, after displaying the BIOS error information correctly. If all the error information options 34 are selected, the determining module 118 transmits the end instruction to the controlling module, step 16 is implemented. If at least one of the error information options 34 is not selected, the determining module 118 transmits the next instruction to the controlling module 116, step 15 is implemented.

In step S15, the control module 118 controls the tested computer 30 to remind the operator that another error information option 34 needs to be selected, the step S1 is repeated.

In step S16, the control module 118 controls the tested computer 30 to remind the operator that the determination is over.

When all the displayed BIOS error information is consistent with the corresponding standard BIOS error information, it is ascertained that the display function of the BIOS error information of the tested computer 30 is normal.

It is to be understood, however, that even though numerous characteristics and advantages of the embodiments have been set forth in the foregoing description, together with details of the structure and function of the embodiments, the disclosure is illustrative only, and changes may be made in details, especially in matters of shape, size, and arrangement of parts within the principles of the embodiments to the full extent indicated by the broad general meaning of the terms in which the appended claims are expressed.

What is claimed is:

1. A system for determining a display function of a basic input output system (BIOS) error information of a tested computer, the tested computer comprising an error information interface with a plurality of error information options allowing operators to select, the system comprising:

an in-target probe (ITP) device connected to the tested computer to control the tested computer; and a main computer connected to the ITP device and the tested computer, the main computer comprising:

a storage unit storing a plurality of error files and some standard BIOS error information, each error file recording a breakpoint address and an amending instruction;

a processor; and a memory connected to the processor, and storing a plurality of modules which computerized instructions being executed by the processor, wherein the plurality modules comprises:

an obtaining module to obtain a corresponding error file from the storage unit according to a selected error information option, and obtain the corresponding breakpoint address and amending instruction from the corresponding error file, and transmit the breakpoint address to the setting module and the amending instruction to the controlling module;

a setting module to control the ITP device to set a breakpoint in the BIOS of the tested computer according to the received breakpoint address;

a determining module to determine whether the running of the BIOS is interrupted; if the running of the BIOS is interrupted, the determining module transmits an interrupting instruction;

a controlling module to control the ITP device to control the tested computer to run the BIOS, and control the ITP device to amend parameters of the corresponding hardware of the tested computer with preset values after receiving the interrupting instruction, according to the received amending instruction; the controlling module further to control the tested computer to continue running the BIOS after amending the parameters of the corresponding hardware, and control the tested computer to display the corresponding error information after running the BIOS; and a comparing module to compare the displayed error information with the stored standard BIOS error information to determine whether the displayed error information is consistent with the corresponding stored standard BIOS error information; if the displayed error information is consistent with the corresponding stored standard BIOS error information, the controlling module reminds that the tested computer can display the BIOS error information correctly.

2. The system of claim 1, wherein the determining module further determines whether all the error information options on the error information interface are selected after displaying the BIOS corresponding error information, if at least one error information option in the error information interface is not selected, the controlling module reminds that another error information option needs to be selected.

3. The system of claim 2, wherein if all the error information options on the error information interface are selected, the determining module transmits an end instruction to the controlling module, the controlling module controls the tested computer to remind that the determination is over.

4. A method for determining a display function of displaying basic input output system (BOIS) error information of a tested computer, the tested computer comprising an error information interface with a plurality of error information options allowing operators to select, the method comprising:
receiving an instruction corresponding to an error information option selected on the error information interface;
obtaining an error file corresponding to the selected error information option according to the received instruction;
obtaining a breakpoint address from the obtained error file and transmitting the breakpoint address;
setting a breakpoint in the BIOS of the tested computer according to the received breakpoint address;
controlling the tested computer to run the BIOS;
determining whether the running of BIOS of the tested computer is interrupted;
obtaining the amending instruction from the obtained error file and transmitting the amending instruction if the running of the BIOS of the tested computer is interrupted;
repeating to implement the step of "determining whether the running of BIOS of the tested computer is interrupted" if the running of the BIOS of the tested computer is not interrupted;
amending parameters of a corresponding hardware of the tested computer with preset values according to the received amending instruction;
controlling the tested computer to continue running the BIOS;
controlling the tested computer to display the BIOS error information after running the BIOS;
comparing the displayed BIOS error information with standard BIOS error information and determining whether the displayed BIOS error information is consistent with the standard BIOS error information;
reminding that the tested computer can display the BIOS error information correctly if the displayed error information is consistent with the standard error information; and
reminding that the tested computer fails to display the BIOS error information correctly if the displayed error information is not consistent with the standard BIOS error information.

5. The method of claim 4, further comprising the following steps after the step of "reminding that the tested computer can display the BIOS error information correctly if the displayed error information is consistent with the standard BIOS error information:"
determining whether all the error information options on the error information interface are selected after displaying the BIOS error information correctly, if all the error information options in the error information interface are selected, the determination is over;
reminding that another error information option needs to be selected if at least one error information option in the error information interface is not selected, repeating implementing the step of "receiving an instruction corresponding to an error information option selected on the error information interface."

* * * * *